United States Patent [19]
Sau

[11] Patent Number: 5,879,440
[45] Date of Patent: Mar. 9, 1999

[54] BIOSTABLE WATER-BORNE PAINTS AND PROCESSES FOR THEIR PREPARATION

[75] Inventor: Arjun Chandra Sau, Newark, Del.

[73] Assignee: Hercules Incorporated, Wilmington, Del.

[21] Appl. No.: 900,138

[22] Filed: Jul. 28, 1997

[51] Int. Cl.$^6$ ...................................................... C09D 7/12
[52] U.S. Cl. ................................... 106/162.1; 106/167.1; 106/163.01; 106/168.01; 106/172.1; 106/205.01; 106/206.01; 106/207.1; 524/27; 524/28; 524/29; 524/31; 524/35; 524/37; 524/42; 524/43; 524/44; 524/45; 524/46; 524/47; 524/50; 524/51
[58] Field of Search ........................... 106/162.1, 163.01, 106/168.01, 172.1, 205.01, 206.01, 207.1; 524/27, 28, 29, 31, 35, 37, 42, 43, 44, 45, 46, 47, 50, 51

[56] References Cited

U.S. PATENT DOCUMENTS

| | | | |
|---|---|---|---|
| Re. 34,904 | 4/1995 | Just et al. | 536/90 |
| 3,708,876 | 1/1973 | Klehm, Jr. | 29/625 |
| 3,709,876 | 1/1973 | Glomski et al. | 260/231 A |
| 3,769,247 | 10/1973 | Glomski et al. | 260/17 |
| 3,974,032 | 8/1976 | Harjes et al. | 195/31 |
| 4,009,329 | 2/1977 | Arney et al. | 536/84 |
| 4,084,060 | 4/1978 | Glass, Jr. et al. | 536/96 |
| 4,228,277 | 10/1980 | Landoll | 536/90 |
| 4,939,192 | 7/1990 | t'Sas | 524/44 |
| 5,120,838 | 6/1992 | Just et al. | 536/90 |
| 5,290,829 | 3/1994 | Angerer et al. | 524/31 |
| 5,366,755 | 11/1994 | Timonen et al. | 426/658 |
| 5,525,368 | 6/1996 | Rha et al. | 426/658 |
| 5,566,759 | 10/1996 | Tjon-Joe-Pin et al. | 166/300 |
| 5,569,483 | 10/1996 | Timonen et al. | 426/658 |

FOREIGN PATENT DOCUMENTS

| | | |
|---|---|---|
| 1014289 | 5/1991 | Canada . |
| 0382577B1 | 5/1996 | European Pat. Off. . |
| 74139272A | 1/1975 | Netherlands . |
| 2281073 | 2/1995 | United Kingdom . |

OTHER PUBLICATIONS

Springle, W.R., "Liquefaction of Cellulosic Paint Thickeners. Part 2: Quantitative Aspects of Enzymatic Degradation," J. Oil and Colour Chemists' Assoc., vol. (71) 4. pp. 109–113 (1988).

Wirick, M.g., "A Study of the Enzymatic Degradation of CMC and Other Cellulose Ethers," Journal of Polymer Science, Part A–1, vol. 6, pp. 1965–1974 (1968).

Wirick, M.G. "Study of the Substitution Pattern of Hydroxyethylcellulose and Its Relationship to Enzymic Degradation," Journal of Polymer Science, Part A–1, vol. 6, pp. 1705–1718 (1968).

Bhattacharjee, S.S. et al., "Enzymatic Degradation of Carboxymethylcellulose and Other Cellulose Derivatives," Journal of Polymer Science, Part C, pp. 509–521 (1971).

Oppermann, R.A. et al., "Presene and Effects of Anaerobic Bacteria in Water–Based Paint. I," Journal of Coatings Technology, vol. 56, No. 712, pp. 509–521 (1971).

Oppermann, R. A. et al., "Presence and Effects of Anaerobic Bacteria In Water–Based Paint. II," Journal of Coatings Technology, vol. 57, No. 730, pp. 33–38 (1985).

Winters, H. et al., "Growth of a Typical Paint Bacterial Isolate In Aqueous Emulsion Paint," Journal of Paint Technology, vol. 46, No. 594, pp. 69–72 (1974).

Winters, H. et al., "Enzymology as It Relates to Mildrew Defacement of Organic Coatings," Journal of Coatings Technology, vol. 50, No. 639, pp. 48–50 (1978).

*Primary Examiner*—David Brunsman
*Attorney, Agent, or Firm*—Martin F. Sloan

[57] ABSTRACT

Water-borne paints containing reduced molecular weight polysaccharide derivatives that are resistant to enzyme hydrolysis. The water-borne paints are biostable, retaining at least about 80% of their initial viscosity 24 hours after they are inoculated with polysaccharide hydrolysis enzyme. A process for making the biostable water-borne paints has the steps: a) treating precursor polysaccharide derivative with polysaccharide hydrolysis enzyme in aqueous medium for a time sufficient to obtain reduced molecular weight polysaccharide derivative; and b) mixing the reduced molecular weight polysaccharide derivative with an effective amount of at least one other water-borne paint ingredient to obtain a water-borne paint.

71 Claims, No Drawings

BIOSTABLE WATER-BORNE PAINTS AND PROCESSES FOR THEIR PREPARATION

FIELD OF THE INVENTION

This invention relates to biostable water-borne paints comprising molecular weight degraded polysaccharide derivatives resistant to enzymatic hydrolysis.

BACKGROUND OF THE INVENTION

Polysaccharides are widely used as thickeners for water-borne coatings, particularly latex paints. Examples include hydroxyethyl cellulose (HEC), hydrophobically modified hydroxyethyl cellulose (HMHEC), ethylhydroxyethyl cellulose (EHEC), hydrophobically modified ethylhydroxyethyl cellulose (HMEHEC), carboxymethyl cellulose (CMC), methyl cellulose (MC), methylhydroxypropyl cellulose (MHPC), starch derivatives, guar derivatives such as hydroxyethyl guar, hydroxypropyl guar, locust bean gum, xanthan and alginates. Functions of the polysaccharide derivatives include adding viscosity to the paints, maintaining the viscosity during storage, and providing desired rheological properties during application of the paints.

Water-soluble cellulose ethers are widely used for thickening water-borne paints. They are typically made by chemically etherifying hydroxyl groups of cellulose with a wide variety of substituents, e.g. hydroxyethyl, hydroxypropyl and carboxymethyl. Cellulose is a linear polymer of anhydroglucose units which are connected by 1→4 β-glycosidic linkages and has a molecular weight of about 500 to about 1,000,000.

The glycosidic linkages of cellulose and cellulose derivatives are susceptible to enzymatic hydrolysis, i.e., a water mediated process of cleaving the glycosidic bonds by cellulolytic enzymes (cellulases) leading to chain scission and molecular weight loss. Other polysaccharides and polysaccharide derivatives will undergo similar hydrolysis catalyzed by polysaccharide hydrolysis enzymes appropriate to the particular polysaccharide.

Many microorganisms release cellulase and/or other polysaccharide hydrolysis enzymes, and so latex paints thickened with cellulose derivatives or other polysaccharide derivatives and contaminated with these microorganisms may undergo viscosity loss upon storage due to molecular weight loss on the part of the polysaccharide thickeners. This effect is discussed by Springle in *Journal of Oil and Colour Chemists' Association*, vol. (71)4, pages 109–113. The viscosity loss of a paint is highly undesirable, because it makes the paint unsuitable for use, and causes a deterioration in the quality of the applied paint film.

One method that has been used to minimize enzymatic degradation of polysaccharide derivatives in paints is the incorporation of biocidal materials in the paints to destroy the microorganisms that produce the hydrolytic enzymes. In the case of cellulose derivatives, there also have been considerable efforts to make them resistant to enzymatic hydrolysis by chemical modification. One approach involves modification of cellulose by a high degree of substitution with placement of substituents uniformly along the chain by manipulation of the substitution reaction conditions. This approach is disclosed in U.S. Pat. Nos. 3,709,876; 3,769,247; 4,009,329 and 4,084,060, all of which are incorporated herein by reference in their entireties.

Canadian Patent No. 1,014,289 discloses water-based protective coating compositions comprising a particular hydroxyethyl cellulose (HEC) which imparts substantially increased biostability to the compositions. The maximum percentage of unsubstituted anhydroglucose units in the HEC is about 11 for molar substitution values ranging between 1.5 and 2.

Currently, available commercial cellulose derivatives are not sufficiently resistant to enzymatic attack. Hence there is a need to develop cellulose and other polysaccharide derivatives that will not undergo molecular weight loss in the presence of cellulase or other polysaccharide hydrolysis enzymes.

M. G. Wirick, in *Journal of Polymer Science*, Part A-1, vol. 6, pages 1705–1718 (1968) discusses the substitution pattern of hydroxyethyl cellulose and its relationship to its enzymatic degradation. In *Journal of Polymer Science*, Part A-1, vol. 6, pages 1965–1974 (1968), Wirick discusses the enzymatic degradation of carboxymethyl cellulose at several substitution levels.

U.S. Pat. No. 3,974,032 discloses a low D.E. starch hydrolysate having a narrow molecular weight distribution, containing less than about 20% by weight of starch oligosaccharides having a degree of polymerization greater than about 200 and having reduced enzyme susceptibility. The use of the low D.E. starch hydrolysates for making syrups having a solids content of 50–80% is disclosed.

U.S. Pat. Nos. 5,366,755, 5,525,368 and 5,569,483 disclose degradation products of polysaccharides or polysaccharide derivatives, and their use in foods. The preferred polysaccharide derivative is a cellulose derivative and the preferred mode of degradation is enzymatic degradation.

U.S. Pat. No. 5,566,759 teaches a method for reducing the viscosity of a cellulose containing fluid used during fracturing of oil and gas wells. An enzyme is used to degrade the polymer. Examples are presented utilizing hydroxyethyl cellulose and carboxymethylhydroxyethyl cellulose.

British patent application GB 2281073A describes reducing the molecular weight of a water-soluble cellulose ether by enzymatic hydrolysis. The viscosity of 2% aqueous solutions of the reduced molecular weight materials are from 1 to 10 cps. The use of the materials for the pigment coating of paper and for increasing the wet strength of paper is disclosed.

EP 382577 B relates to enzymatic hydrolysis of a cellulose derivative to form a mixture of oligomers having an average degree of polymerization in the range of 3 to 300 and a molecular weight of 500 to 100,000. Use of the oligomers in food is described.

Netherlands patent application NL 7413972 discloses natural gums such as gum arabic, gum tragacanth, alginic acid, ghatti gum, etc., that are modified by hydrolysis in the presence of a hydrolyzing agent which may be an enzyme. The products give oil-in-water emulsions, e.g. wax emulsions, with improved stability and lower viscosity.

SUMMARY OF THE INVENTION

A ready-to-apply water-borne paint composition comprises at least one molecular weight degraded polysaccharide derivative resistant to enzymatic hydrolysis, and at least one other water-borne paint ingredient. Preferably the freshly prepared water-borne paint composition retains at least about 80% of its initial viscosity 24 hours after it is inoculated with polysaccharide hydrolysis enzyme, and the polysaccharide derivative is characterized by a 1% solution of it in water retaining at least about 55% of its initial viscosity 24 hours after the solution is inoculated with polysaccharide hydrolysis enzyme.

A process for making a water-borne paint resistant to enzymatic hydrolysis comprises: a) providing at least one molecular weight degraded polysaccharide derivative resistant to enzyme hydrolysis; and b) mixing the polysaccharide derivative with an effective amount of at least one other water-borne paint ingredient to obtain a water-borne paint.

According to another embodiment in accordance with the instant invention, a process for making biostable water-borne paint comprises: a) treating a precursor polysaccharide derivative with a polysaccharide hydrolysis enzyme in aqueous medium for a time sufficient to obtain a reduced molecular weight polysaccharide derivative; and b) mixing the reduced molecular weight polysaccharide derivative with an effective amount of at least one other water-borne paint ingredient to obtain a water-borne paint.

As indicated above, latex paints thickened with cellulose or other polysaccharide derivatives and contaminated with microorganisms or enzymes are known to undergo viscosity loss upon storage due to molecular weight loss on the part of the polysaccharide thickeners leading to paints unsuitable for application. Thus the results of this invention, that biostable paints can be made by use of already molecular weight degraded polysaccharide derivatives, are quite unexpected.

DETAILED DESCRIPTION OF THE INVENTION

With respect to the water-borne paint compositions of the invention, the term "ready-to-apply water-borne paint" is defined as meaning a paint with adequate properties for the intended use, i.e., application to a desired substrate by conventional methods, e.g., brushing, spraying or roller application, and formation of an integral film upon drying. Thus, the term excludes paints that upon storage have undergone substantial viscosity loss or increase, substantial separation of components or substantial loss of water.

Derivatives of polysaccharides having a polymer backbone including one or more sugar monomers such as glucose, galactose, arabinose, mannose, fructose, galacturonic acid, rhamnose and xylose or their derivatives are suitable precursors for preparing the enzyme resistant polysaccharide derivatives of this invention. Such polymer backbones may be branched or straight. Examples of such polysaccharides include, but are not limited to, cellulose, starch, guar, pectin, pullulan, alginate, xanthan and gellan. Preferred are cellulose, starch and guar. Most preferred is cellulose.

Examples of derivatives of polysaccharides useful in the invention include, but are not limited to, polysaccharide ethers, polysaccharide esters, polysaccharide amides, polysaccharide urethanes, and polysaccharide carbonates.

A wide variety of ether derivatives of cellulose is available and suitable for use in preparing the water-borne paints of the invention. Examples of precursor cellulose ethers are hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC), and cationic hydrophobically modified hydroxyethyl cellulose (cationic HMHEC). Preferred cellulose ethers are hydroxyethyl cellulose (HEC), carboxymethyl cellulose (CMC), hydrophobically modified hydroxyethyl cellulose (HMHEC), methylhydroxypropyl cellulose (MHPC), ethylhydroxyethyl cellulose (EHEC) and hydrophobically modified ethylhydroxyethyl cellulose (HMEHEC). The most preferred cellulose ethers are hydroxyethyl cellulose and hydrophobically modified hydroxyethyl cellulose (HMHEC).

The above listed cellulose ethers may contain small amounts of other functionality also, so long as the amount of such other functionality is not so great that the water solubility of the cellulose ether is eliminated. Examples of such other functionality include, but are not restricted to, ester and urethane.

Methods for producing hydrophobically modified hydroxyethyl cellulose by reacting hydroxyethyl cellulose with alkylglycidyl ethers where the alkyl group contains from 1 to 10 carbon atoms are disclosed by t'Sas in U.S. Pat. No. 4,939,192, which is incorporated herein in its entirety by reference. Methods for producing hydrophobically modified nonionic water-soluble cellulose ethers by substitution with hydrocarbon radicals having from about 10 to 24 carbon atoms are disclosed in U.S. Pat. No. 4,228,277 to Landoll, which is incorporated herein in its entirety by reference. In this patent, a variety of chemical methods, e.g., ether linkages, ester linkages, amide linkages and urethane linkages, for attaching the hydrocarbon radicals are disclosed. Water-soluble cellulose ethers which are modified with $C_{10}$ to $C_{24}$ long chain alkylaryl groups are disclosed by Just et al. in U.S. Pat. No. Re. 34,904, a reissue of U.S. Pat. No. 5,120,838, both of which are incorporated herein in their entireties by reference. The disclosures of these patents include cellulose ethers with spacer groups of various lengths between the alkylaryl group and the connecting group to the cellulose molecule. Hydroxyethyl cellulose and hydroxypropyl cellulose hydrophobically modified with a perfluorinated alkyl hydrophobe glycidyl ether are disclosed by Angerer et al. in U.S. Pat. No. 5,290,829, which is incorporated herein in its entirety by reference.

For the instant invention, etherification of hydroxyethyl cellulose with moieties containing about 10 to about 24 carbon atoms in an amount of about 0.1 to about 3 wt. % is preferred. The most preferred hydrophobically modified hydroxyethyl cellulose is substituted by an organic radical containing about 16 carbon atoms in an amount of about 0.1 to about 3 wt. %.

Examples of precursor guar derivatives for use in the invention are carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar) and hydrophobically modified cationic guar (HM cationic guar). The above listed guar derivatives may contain small amounts of other functionality so long as the amount of such other functionality is not so great that the water solubility of the guar derivative is eliminated. Examples of such other functionality include, but are not restricted to, ester and urethane.

With respect to derivatives of starch, pectin, guar, pullulan, alginate and gellan, water-soluble ethers and esters are preferred. Pectin derivatives may also include amidated pectin derivatives.

Polysaccharide derivatives may be characterized by their degree of substitution (DS). DS refers to the average number of hydroxyl groups per monomer unit in the polysaccharide backbone that are substituted by other groups, e.g. carboxymethyl or hydroxyethyl. A DS of 2, for example, would mean that on average, two of the three hydroxyl groups of a monomer unit are substituted. When the polysaccharide derivatives are hydroxyalkylated derivatives, they may also be characterized by their molar substitution (MS), which is the average number of moles of alkylene oxide, e.g., ethylene oxide, that are attached to each monomer unit in the polysaccharide. Preferably, for this invention the precursor polysaccharide derivatives have a minimum degree of substitution (DS) of about 0.5, and more preferably about 1. The preferred maximum DS is about 2.9. When the molecular weight degraded enzyme resistant polysaccharide derivative is a cellulose or guar derivative, the degree of substitution (DS) is at least as high, and quite often higher than that of its precursor. Precursor hydroxyalkylated polysaccharides preferably have an MS of about 1 or higher in order to assure water solubility.

The molecular weight degraded enzyme resistant polysaccharide derivatives of this invention may be prepared by treatment of precursor polysaccharide derivatives with appropriate polysaccharide hydrolysis enzyme. The enzyme is selected depending upon the polysaccharide derivative to be treated. For example, in the case of cellulose derivatives the enzyme will comprise a cellulase or modified cellulase. The enzymes are derived from microorganisms, generally fungal or bacterial, and are commercially available. Non-limiting examples of such organisms are Trichoderma reesi, Aspergillus niger and Penicillium. In the case of starch derivatives, enzymes such as amylases are suitable. Examples of other polysaccharide hydrolysis enzymes suitable for treating precursor polysaccharide derivatives of the invention are pectinases, mannases and pullanases.

The treatment of precursor polysaccharide derivative with enzyme can be carried out in solution in aqueous medium, as a solid slurry in aqueous medium, or on solid polysaccharide derivative in the presence of an aqueous medium. The aqueous medium may contain organic solvent in addition to water. Exemplary organic solvents are acetone, alcohols, hexane and heptane. When the enzyme treatment is carried out in solution, the concentration of the polysaccharide derivative is not critical, the upper limit of the concentration being limited only by the high viscosity of the solutions that may result from high concentrations and the resultant difficulty in stirring and handling.

When the enzyme treatment is carried out on a solid slurry of precursor polysaccharide derivative in aqueous medium, or as solid precursor polysaccharide derivative in the presence of aqueous medium, the minimum level of aqueous medium preferably will be about 15 wt. %, more preferably 20 wt. % and most preferably about 25 wt. % based on the total weight of aqueous medium and precursor polysaccharide. The maximum level of aqueous medium preferably will be about 70 wt. %, more preferably about 60 wt. % and most preferably about 50 wt. %. Treatment of solid precursor polysaccharide derivative can be carried out by agitating the solid derivative in the presence of a small amount of aqueous medium containing the polysaccharide hydrolysis enzyme. Spraying the enzyme-containing aqueous medium onto the agitated solid derivative is a preferred way to carry out the molecular weight degradation.

In the enzyme treatment processes the polysaccharide derivative, as a solution, slurry or solid containing aqueous medium, as discussed above, is treated with a small amount of polysaccharide hydrolysis enzyme, and the reaction mixture is then mixed for a sufficient time to cleave the polysaccharide chains at the enzymatically cleavable glycosidic linkages, and thus reduce molecular weight. At the end of the treatment period the enzyme is deactivated. Any of a variety of deactivation methods may be used. Examples include, but are not limited to, heat, change in pH, treatment with a protease, and inhibition of the enzyme active site with metal ion.

The time and temperature necessary for the enzyme treatment are dependent on a variety of factors including the particular polysaccharide derivative, the enzyme that is used, the amount of enzyme used, and the reaction temperature. The temperature for reaction is preferably from about room temperature, i.e., about 20°–25° C., up to a temperature where the enzyme may become inactivated, about 80°–85° C. Temperatures lower than room temperature may be utilized, but with a concomitant increase in reaction time.

The amount of polysaccharide hydrolysis enzyme used for the treatment is not critical. Even very small amounts will allow the reaction to proceed, albeit at a low rate. Preferably the minimum amount of enzyme is about 1 unit per gram of polysaccharide derivative. More preferably, the minimum amount is about 2, and most preferably about 5 units per gram. The preferred maximum amount of enzyme is about 100 units per gram of polysaccharide derivative. A more preferable maximum amount is 75 units and most preferable about 50 units per gram. A "unit" of enzyme is the amount which, under standard pH and temperature conditions, degrades a "standard polysaccharide" to reducing carbohydrates with a reduction power corresponding to 1 $\mu$mole of glucose per minute. The "standard polysaccharide" is different for different enzyme systems. For example, for cellulase enzyme the standard is carboxymethyl cellulose.

The molecular weight degraded enzyme resistant polysaccharide derivatives are water-soluble, i.e., they have at least about 1% solubility in water at room temperature. After deactivation of the enzyme, they may be dried, or used in the solution, slurry, or water-wet form for preparation of the biostable water-borne paints of this invention. Because of the small amount of enzyme used for the treatment, it is generally satisfactory to use the product without any removal of the enzyme residue. If desired, or necessary, standard purification procedures well known in the art can be used to further purify the biostable polysaccharide derivative products.

The treatment with enzyme is carried out for a time sufficient to degrade the molecular weight of the precursor polysaccharide derivative to a desired level. That time will vary depending on the identity of the polysaccharide derivative precursor, its molecular weight, the temperature, the enzyme activity, and other such factors well known to those skilled in the art. Whether or not the molecular weight has been degraded sufficiently to obtain an enzyme resistant polysaccharide derivative can be determined by testing the enzyme resistance of polysaccharide derivative as herein described.

The enzyme resistance of the molecular weight degraded polysaccharide derivatives is assessed by determining the viscosity stability of aqueous solutions of the derivatives after they are inoculated with the appropriate polysaccharide hydrolysis enzyme. For example, the biostability of a hydroxyethyl cellulose would be determined by inoculation of an aqueous solution of it with cellulase enzyme, and that of hydroxyethyl guar by inoculation of an aqueous solution with mannase. As 1% solutions in water the enzyme resistant polysaccharides preferably retain at least about 55% of their initial viscosity 24 hours after the solutions are inoculated with about 2 units of polysaccharide hydrolysis enzyme per gram of polysaccharide derivative. More preferably the 1% aqueous solutions retain at least about 75%, and most preferably at least about 80%, of their viscosity under the same conditions.

Treatment of precursor polysaccharide derivatives with polysaccharide hydrolysis enzyme reduces their molecular weight and concomitantly their solution viscosity. For the purposes of making the biostable water-borne paints of the invention, the preferred minimum viscosity of a 1% aqueous solution of molecular weight degraded polysaccharide derivative is about 5 cps. A more preferred minimum viscosity is about 50 cps., even more preferred minimum about 150 cps and most preferred minimum about 500 cps. The preferred maximum viscosity of the molecular weight degraded polysaccharide derivative is about 60,000 cps.

Typical water-borne paint compositions comprise water, latex film forming polymeric binder, pigment and thickener. The kind and amount of latex polymer is not critical and may be provided based on procedures well known in the art. Typical latex polymers include, but are not limited to, acrylics, alkyds, celluloses, coumarone-indenes, epoxies, esters, hydrocarbons, melamines, natural resins, oleo resins, phenolics, polyamides, polyesters, rosins, silicones, styrenes, terpenes, ureas, urethanes, vinyls, vinyl acrylics and the like. Illustrative latex film forming polymeric binders include, but are not limited to, one or more homo- or copolymers containing one or more of the following monomers: (meth)acrylates, vinyl acetate, styrene, ethylene, vinyl chloride, butadiene, vinylidene chloride, vinyl versatate, vinyl propionate, t-butyl acrylate, acrylonitrile, maleates, fumarates, and the like, including plasticized or other derivatives thereof.

Titanium dioxide is the most common pigment in paints. In addition, many different colored pigments are used. They may be metallic oxides, e.g. iron or chromium oxide, or synthetic organic pigments.

Paints are commonly characterized in terms of their pigment volume concentration (PVC), which is the volume relationship of pigment to binder in the dry paint film. The PVC, usually expressed as a percentage, is the total pigment volume ($V_p$) divided by the total volume of pigment and binder ($V_b$) in the dry film, or $$PVC(\%) = \frac{100 \times V_p}{V_p + V_b}.$$

The minimum value of the PVC for the water-borne paints of this invention is preferably about 15%. The maximum value is preferably about 85%, and most preferably about 80%.

The amount of molecular weight degraded polysaccharide derivative used in the water-borne paints of the invention is the amount effective in providing the desired thickening and rheological properties to the coating composition and thus will depend upon both the Theological properties desired and the particular molecular weight degraded polysaccharide derivative employed. Typically, when cellulose ethers are employed, the preferred minimum amount is about 0.01 wt. %, and the most preferred minimum about 0.05 wt. % of the coating composition. The preferred maximum amount is 10 wt. %, and the most preferred maximum amount about 5 wt. %.

The water-borne paints may optionally contain other components such as those generally used in such compositions. Typical components include, but are not limited to, one or more of the following: solvents, fillers, dryers, flatting agents, plasticizers, stabilizers, dispersants, surfactants, viscosifiers, suspension agents, flow control agents, defoamers, anti-skinning agents, preservatives, extenders, filming aids, crosslinkers, surface improvers, corrosion inhibitors, and other ingredients useful in water-borne paint compositions.

The water-borne paints of the invention are characterized by their biostability. That is, they resist viscosity loss due to enzymatic hydrolysis of the polysaccharide derivatives present. The freshly-made paints of the invention preferably retain at least about 80% of their initial viscosity 24 hours after they are inoculated with about 5 units of polysaccharide hydrolysis enzyme per 100 g of coating. More preferably, under these conditions they retain at least about 90%, even more preferably at least about 95%, and most preferably at least about 98% of their initial viscosity 24 hours after inoculation. The polysaccharide hydrolysis enzyme used to test paint biostability is the enzyme or enzymes that will hydrolyze the particular polysaccharide present in the paint. This is, if the thickener is a cellulose derivative, the enzyme is cellulase, and if the thickener is a guar derivative, the enzyme is mannase. For a starch derivative the appropriate enzyme is an amylase.

Preferably the thickeners used in the water-borne paints of the invention are molecular weight degraded cellulose ether, guar ether or starch ether prepared as hereinabove described. More preferably, they are molecular weight degraded cellulose ethers selected from the group consisting of hydroxyethyl cellulose (HEC), carboxymethyl cellulose (CMC), hydrophobically modified hydroxyethyl cellulose (HMHEC), methylhydroxypropyl cellulose (MHPC), ethylhydroxyethyl cellulose (EHEC), hydrophobically modified ethylhydroxyethyl cellulose (HMEHEC) and mixtures thereof. Most preferably they are hydroxyethyl cellulose (HEC) and hydrophobically modified hydroxyethyl cellulose (HMHEC) as described hereinabove.

This invention is illustrated by the following examples, which are exemplary only and not intended to be limiting. All percentages, parts, etc., are by weight, unless otherwise indicated.

PROCEDURES

Solution Viscosity of Polysaccharide Derivative Solutions

The solution viscosities of 1% aqueous solutions of polysaccharide derivatives were measured using a Brookfield viscometer (Model DV-I) at 30 rpm at ambient temperature. The results are reported in centipoises (cps).

Molecular Weight Determination

The weight average molecular weights of the cellulose derivatives were measured by size exclusion chromatography (SEC). The SEC measurements were performed in 0.20M lithium acetate buffer (pH 4.8) plus 0.25% random methyl β-cyclodextrin (RAMEB-CD) mobile phase with both the columns and the refractive index detector thermostated at 40° C. The polymers were chromatographed through a set of TSK-Gel columns (3 GMPWXL linears+ G3000PWXL in series) at a flow rate of 1.0 ml/minute. A sample concentration of 0.20% was used with an injection volume of 200 μl. The molecular weight distribution data are relative to a polyethylene oxide/polyethylene glycol calibration and are not absolute.

Paint Properties of Enzyme-Treated Polysaccharides

The enzyme treated HEC's were incorporated into a UCAR 367 vinyl-acrylic latex based interior flat formula (pigment volume concentration=60%) to achieve an initial Stormer viscosity of 95–100 Kreb Units (KU). The details of the vinyl-acrylic flat paint formulation are shown in Table 1.

MATERIALS

Tamol® 731 A dispersant, available from Rohm and Haas Co., Philadelphia, Pa.

Triton® N-101 surfactant, available from Union Carbide Corp., Danbury, Conn.

AMP-95 (2-amino-2-methyl-1-propanol), available from Angus Chemical Co., Buffalo Grove, Ill.

Colloid 640 Antifoam, available from Rhone-Poulenc Inc., Kennesaw, Ga.

Ti-Pure® R-931 titanium dioxide, available from E.I. DuPont de Nemours & Co., Wilmington, Del.

Satintone® W calcined clay, available from Engelhard Industries, Edison, N.J.

ECC #1 white calcium carbonate, available from ECC International, Sylacauga, Ala.

UCAR® 367 vinyl-acrylic latex, available from Union Carbide Corp., Danbury, Conn.

Texanol® coalescent, available from Eastman Chemical Co. Kingsport, Tenn.

Proxel® GXL biocide, available from ICI Americas, Wilmington, Del.

TABLE 1

Vinyl-acrylic interior flat paint formula

BASE PAINT
Pigment Grind

| Ingredient | Grams /1000 gram |
|---|---|
| Water | 130.5 |
| Dispersant (Tamol ® 731 A) | 4.8 |
| Dispersant (potassium tripolyphosphate) | 1.0 |
| Triton ® N-101 surfactant | 2.3 |
| AMP-95 | 1.0 |
| Propylene glycol | 18.1 |
| Colloid 640 Antifoam | 2.0 |
| Water, Discretionary | 97.0 |
| (added as needed for effective dispersion) | |
| Titanium dioxide (Ti-Pure ® R-931) | 156.6 |
| Satintone ® W calcined clay | 130.5 |
| ECC #1 White calcium carbonate | 208.8 |

Disperse to Hegman 4 to 5 and let-down at slower speed as follows.

Letdown

| Ingredient | Grams/1000 grams |
|---|---|
| UCAR ® 367 Vinyl-acrylic latex | 236.2 |
| Texanol ® coalescent | 8.2 |
| Colloid 640 Antifoam | 2.0 |
| Biocide (Proxel ® GXL) | 1.0 |
| Pigment grind (above) | 752.6 |
| Total | 1,000 |

The above base paint (230 g) was mixed with the appropriate amount of thickener (as a 0.3–2 wt. % solution in water) to adjust the Stormer viscosity of the paint to 97±2 KU. The total weight of water and thickener was 50 g.

Formula Constants for the Thickened Paint

| | |
|---|---|
| Pigment volume concentration | 60% |
| Nonvolatile volume | 33% |
| Nonvolatile weight | 52% |
| Pounds/gallon | 11.63 |
| Stormer viscosity (initial) | 95 KU |
| pH | 8.0 |

EXAMPLE 1

This example describes the enzyme treatment of hydroxyethyl cellulose (HEC) in aqueous solution.

A stock solution of Celluclast®1.5L cellulase (available from Novo Nordisk A/S, Denmark) with an activity of 100 units/gram was prepared as follows. Five (5) grams of the enzyme solution with an activity of 1,500 units/gram was mixed with 70 g of 0.05 molar sodium acetate buffer solution to form a stock solution with an activity of 100 units/gram. One (1) unit is the amount which under standard conditions (40° C., pH 4.8, 20 minutes) degrades CMC 7LFD carboxymethyl cellulose (Hercules Incorporated, Wilmington, Del.) to reducing carbohydrates with a reduction power corresponding to 1 μmole glucose per minute.

To a reactor were added 600 g of distilled water, 0.98 g of 10% hydrochloric acid solution, and 3 g of the stock enzyme solution. The resulting mixture was heated to 60° C. and then 52.5 g of glyoxal crosslinked hydroxyethyl cellulose (Natrosol®250 MBR, 1% solution viscosity, ~770 cps) (available from Hercules Incorporated, Wilmington, Del.), was slowly added over a period of 10 minutes with gentle agitation. The resulting mixture was then heated at 60° C. for 1 hour and then at 95° C. for 15 minutes to deactivate the enzyme. The reaction mixture was then cooled to room temperature and treated with 3.6 g of Proxel® GXL biocide.

A 1% solution of the enzyme treated HEC was made by appropriately diluting the reaction mixture with water. The viscosity was 244 cps.

EXAMPLE 2

This example describes the enzyme treatment of hydroxyethyl cellulose (HEC) in an aqueous slurry.

To a glass jar containing 200 g of distilled water was added 30 g of Natrosol®250 MBR glyoxal crosslinked HEC (1% solution viscosity~770 cps). The pH of the slurry was 6.4. To this HEC slurry hydrochloric acid solution was added dropwise to adjust the pH of the slurry to 5, and then 3 g of the stock enzyme solution prepared in Example 1 were added. The resulting reaction mixture was stirred at 18° C. for 3.5 hours. The resulting HEC slurry was poured onto acetone (1000 ml) under strong agitation to insolubilize the partially dissolved HEC fraction. The insoluble HEC was filtered and the residue was washed twice with 500 ml portions of acetone. The enzyme treated HEC thus obtained was dried in a convection oven at 61° C. for 2.5 days and then at 90° C. for 1 hour to deactivate any enzyme left in the sample.

A 1% aqueous solution had a viscosity of 275 cps.

EXAMPLE 3

This example describes enzyme treatment of hydrophobically modified hydroxyethyl cellulose (HMHEC) in aqueous solution.

To a reactor were added 576 g of distilled water, 0.6 g of 10% hydrochloric acid solution, and 3 g of the stock enzyme solution described in Example 1. The resulting mixture was heated to 60° C. and then 25.3 g of Natrosol Plus®HM-HEC (Grade 331) (1% solution viscosity, 280 cps) (available from Hercules Incorporated, Wilmington, Del.), was slowly added over a period of 10 minutes with gentle agitation. The resulting mixture was then heated at 60° C. for 2 hours and then heated at 95° C. for 15 minutes to deactivate the enzyme. The reaction mixture was then cooled to room temperature and treated with 0.6 g of Proxel® GXL biocide.

A 1% solution of the enzyme treated HMHEC was made by appropriately diluting the reaction mixture with water. The viscosity was 175 cps.

EXAMPLE 4

This example describes the preparation and enzyme treatment of high molecular weight HEC.

To a Chemco reactor containing a mixture of 925 g of t-butyl alcohol, 120 g of water and 27 g of sodium hydroxide was added 84 g of Buckeye HVE cellulose (available from Buckeye Corp., Spartanburg, S.C.). The resulting mixture was vigorously stirred at room temperature for 1 hour and then 80 g of ethylene oxide was added. The resulting mixture heated at 70° C. for 1 hour. After that the reaction mixture was cooled to 50° C., and 52 g of 70% nitric acid and 57 g of additional ethylene oxide were added. The resulting reaction mixture was heated at 95° C. for 90 minutes, cooled to 50° C. and neutralized with 9 g of 70% nitric acid. It was then filtered and the residue was washed three times with 80:20 acetone/water mixture; then the purified polymer was dehydrated with acetone. The dehydrated polymer was further dried in a fluid bed drier at 50° C. for 0.5 hour.

The hydroxyethyl molar substitution (MS) of the HEC thus isolated was 4.3, and its 1% solution viscosity was 3350 cps.

The HEC was treated with a cellulase enzyme at pH 5.1 according to the procedure described in Example 1. The following reagents were used: HEC, 25.3 g; water, 576 g; Celluclast® 1.5L cellulase (activity: 100 units/g), 3 g; Proxel GXL, 0.6 g.

The viscosity of a 1% solution of the enzyme treated HEC was 780 cps.

EXAMPLE 5

This example describes the preparation and enzyme treatment of high molecular weight hydrophobically modified HEC (HMHEC).

Rayonex F cellulose (available from Rayonier Inc., Stamford, Conn.) was treated with sodium hydroxide, with ethylene oxide and cetyl glycidyl ether using the procedures described in U.S. Pat. No. 4,902,733, which is incorporated herein in its entirety by reference. The product had a hydroxyethyl molar substitution of 2.95 and a cetyl content of 0.7%. The 1% solution viscosity was 1,072 cps.

The HMHEC was treated with cellulase enzyme by the procedure described in Example 4. The 1% aqueous viscosity of the product was 122 cps.

EXAMPLE 6

This example describes enzyme treatment of ethylhydroxyethyl cellulose (EHEC).

The conditions described above for Example 3 were used to treat Bermocoll® ethylhydroxyethyl cellulose (available from Akzo Nobel, Amersfoort, Netherlands) with a 1% solution viscosity of 3,400 cps. The 1% solution viscosity of the enzyme treated product was 185 cps.

EXAMPLE 7

This example describes enzyme treatment of methylhydroxypropyl cellulose (MHPC).

The conditions described above for Example 3 were used to treat Methocel® J75MS MHPC (available from Dow Chemical Co., Midland, Mich.) with a 1% aqueous solution viscosity of 1,500 cps. The 1% solution viscosity of the product was 480 cps.

EXAMPLE 8

This example describes enzyme treatment of hydrophobically modified ethylhydroxyethylcellulose (HMEHEC).

The conditions described above for Example 3 were used to treat Bermocoll® EHM 100 hydrophobically modified ethylhydroxyethylcellulose (available from Akzo Nobel, Amersfoort, Netherlands) with a 1% aqueous solution viscosity of~3,200 cps. The 1% solution viscosity of the product was 100 cps.

EXAMPLE 9

This example describes the viscosity stability of aqueous solutions of molecular weight degraded cellulose ether samples prepared by methods of the previous examples, and the viscosity stability of aqueous paint formulations containing the molecular weight degraded cellulose ethers when inoculated with cellulase enzyme.

The enzyme utilized for testing was Sigma C-1424 cellulase (γ-irradiated) from Aspergillus niger (available from Sigma Chemical Co., St. Louis, Mo.) with an activity of 4.9 units/mg. A unit for cellulase enzyme is defined as the amount of enzyme which degrades carboxymethyl cellulose to 1.0 $\mu$mole of glucose per minute at pH 5 and 37° C.

For the aqueous solution test, 1% aqueous solutions (except where noted) of cellulose ethers were inoculated with the enzyme at the level of 2.45 units per gram of polysaccharide derivative. Viscosities were measured after 24 hours at room temperature. The results are in Table 2. In each case the "Control" examples utilized the precursor cellulose ether that was used to prepare for the respective molecular weight degraded cellulose ether.

For the paint tests, paint formulations prepared by the procedure described above were inoculated with enzyme at the level of 4.9 units per 100 g of paint. Viscosities were measured after 24 hours at room temperature.

The results show clearly that the aqueous solutions of molecular weight degraded cellulose ethers and the water-borne paints containing them retained a substantially greater percentage of their viscosity in the presence of cellulase than did solutions and paints containing the corresponding precursor cellulose ethers.

TABLE 2

Viscosity Stability of Enzyme treated Cellulose Ethers

| Cellulose Ether | Prepared by Method of Example | 1% Aqueous Solutions | | | Water-Based Paint | | |
|---|---|---|---|---|---|---|---|
| | | Initial Viscosity, cps | Viscosity after 24 hrs. Cellulase at 2.45 units/g of HEC | % Viscosity Retained | Initial Viscosity, Stormer Kreb Units | Viscosity after 24 hrs. - Cellulase at 4.9 units/100 g of Paint | % Viscosity Retained |
| HEC | 4 | 524 | 468 | 89 | 100 | 99 | 99 |
| | control | 2,496 | 672 | 27 | 98 | 87 | 89 |
| HEC | 4 | 116 | 112 | 97 | 91[b] | 91 | 100 |
| | control | 2,780 | 344 | 12 | 100 | 81 | 81 |
| EHEC | 6 | 100 | 68 | 68 | 74[b] | 62 | 84 |
| | control | 2,560 | 264 | 10 | 99 | 57 | 58 |
| HMEHEC | 8 | 204 | 156 | 76 | 79[b] | 73 | 92 |
| | control | 3,180 | 1,490 | 47 | 99 | 72 | 73 |
| MHPC | 7 | 1,148[a] | 784 | 68 | 95 | 78 | 82 |
| | control | 780 | 88 | 11 | 98 | 69 | 70 |

HEC = Hydroxyethyl cellulose; EHEC = Ethylhydroxyethyl cellulose; HMEHEC = Hydrophobically modified ethylhydroxyethyl cellulose; MHPC = Methylhydroxypropyl cellulose
[a]2% aqueous solution
[b]These samples were too inefficient to reach the initial Stormer viscosity target of 95 KU.

This example describes the enzymatic molecular weight degradation of hydroxyethyl cellulose by means of a high solids process.

To an Abbe ribbon blender reactor were added 500 g of Natrosol®250 HBR hydroxyethyl cellulose (available from Hercules Incorporated, Wilmington, Del.) having a 1% aqueous solution Brookfield viscosity of 1900 cps., and eight one-inch square serrated Teflon® chips. After the reactor was sealed, the blender was initiated to agitate the HEC powder. Onto the well agitated HEC powder was sprayed (Veejay spray nozzle) a solution of 70 g of the stock enzyme solution of Example 1 in 500 ml of water over a period of 15 minutes. The resulting cellulase treated HEC was then heated at 60°–65° C. for 4 hours and then at 90° C. for 0.5 hour. After cooling to room temperature, the reactor contents were discharged and dried at 50° C. for 1 hour in a fluid bed dryer. The Brookfield viscosity of a 1% aqueous solution of the product was 330 cps.

The molecular weight reduced HEC was formulated into a paint as described in the previous example. The Stormer viscosity was 96 KU. The prepared paint formulation was inoculated with enzyme at the level of 4.9 units per 100 g of paint. The viscosity measured after 24 hours at room temperature and found to be 95 KU, indicating a 99% retention of viscosity.

A control paint formulation made in the same way using Natrosolr®250 HBR hydroxyethyl cellulose which had not been enzyme treated for molecular weight reduction retained only 87% of its viscosity in the same enzyme resistance test.

It is not intended that the examples presented here should be construed to limit the invention, but rather they are submitted to illustrate some of the specific embodiments of the invention. Various modifications and variations of the present invention can be made without departing from the scope of the appended claims.

What is claimed is:

1. A process for making a biostable water-borne paint comprising:

a) providing molecular weight degraded polysaccharide derivative resistant to enzymatic hydrolysis by polysaccharide hydrolysis enzyme; and b) mixing the molecular weight degraded polysaccharide derivative with an effective amount of at least one other water-borne paint ingredient.

2. The process of claim 1 wherein the other water-borne paint ingredient is selected from the group consisting of pigment and latex film forming polymeric binder.

3. The process of claim 1 wherein the pigment volume concentration (PVC) of the water-borne paint is from about 15 to about 85%.

4. The process of claim 1 wherein the pigment volume concentration (PVC) of the water-borne paint is from about 15 to about 80%.

5. The process of claim 1 wherein the water-borne paint retains at least about 80% of its initial viscosity 24 hours after it is inoculated with polysaccharide hydrolysis enzyme.

6. The process of claim 1 wherein the water-borne paint retains at least about 90% of its initial viscosity 24 hours after it is inoculated with polysaccharide hydrolysis enzyme.

7. The process of claim 1 wherein the water-borne paint retains at least about 95% of its initial viscosity 24 hours after it is inoculated with polysaccharide hydrolysis enzyme.

8. The process of claim 1 wherein the water-borne paint retains at least about 98% of its initial viscosity 24 hours after it is inoculated with polysaccharide hydrolysis enzyme.

9. The process of claim 1 wherein a 1% aqueous solution of the molecular weight degraded polysaccharide derivative resistant to enzyme hydrolysis has a viscosity of about 5 to about 60,000 cps.

10. The process of claim 1 wherein a 1% aqueous solution of the molecular weight degraded polysaccharide derivative resistant to enzyme hydrolysis has a viscosity of about 15 to about 60,000 cps.

11. The process of claim 1 wherein a 1% aqueous solution of the molecular weight degraded polysaccharide resistant to enzyme hydrolysis has a viscosity of about 50 to about 60,000 cps.

12. The process of claim 1 wherein a 1% aqueous solution of the molecular weight degraded polysaccharide derivative resistant to enzyme hydrolysis has a viscosity of about 150 to about 60,000 cps.

13. The process of claim 1 wherein a 1% aqueous solution of the molecular weight degraded polysaccharide derivative resistant to enzyme hydrolysis has a viscosity of about 500 to about 60,000 cps.

14. The process of claim 1 wherein the molecular weight degraded polysaccharide derivative resistant to enzyme hydrolysis is characterized by a 1% solution of it in water retaining at least about 55% of its initial viscosity 24 hours after the solution is inoculated with polysaccharide hydrolysis enzyme.

15. The process of claim 1 wherein the molecular weight degraded polysaccharide derivative resistant to enzyme hydrolysis is characterized by a 1% solution of it in water retaining at least about 75% of its initial viscosity 24 hours after the solution is inoculated with polysaccharide hydrolysis enzyme.

16. The process of claim 1 wherein the molecular weight degraded polysaccharide derivative resistant to enzyme hydrolysis is characterized by a 1% solution of it in water retaining at least about 80% of its initial viscosity 24 hours after the solution is inoculated with polysaccharide hydrolysis enzyme.

17. The process of claim 1 wherein the molecular weight degraded polysaccharide derivative is selected from the group consisting of cellulose derivatives, guar derivatives, starch derivatives, pectin derivatives, pullulan derivatives, alginate derivatives, gellan derivatives and mixtures thereof.

18. The process of claim 1 wherein the molecular weight degraded polysaccharide derivative is selected from the group consisting of ether derivatives of polysaccharides, ester derivatives of polysaccharides, amide derivatives of polysaccharides, urethane derivatives of polysaccharides and mixtures thereof.

19. The process of claim 1 wherein the molecular weight degraded polysaccharide derivative is a derivative of cellulose and the polysaccharide hydrolysis enzyme is cellulase.

20. The process of claim 1 wherein the molecular weight degraded polysaccharide derivative is cellulose ether and the polysaccharide hydrolysis enzyme is cellulase.

21. The process of claim 1 wherein the polysaccharide hydrolysis enzyme is cellulase and the molecular weight degraded polysaccharide derivative is cellulose ether selected from the group consisting of hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC), cationic hydrophobically modified hydroxyethyl cellulose (cationic HMHEC) and mixtures thereof.

22. The process of claim 1 wherein the polysaccharide hydrolysis enzyme is cellulase and the molecular weight degraded polysaccharide derivative is cellulose, ether selected from the group consisting of hydroxyethyl cellulose (HEC), carboxymethyl cellulose (CMC), hydrophobically modified hydroxyethyl cellulose (HMHEC), methylhydroxypropyl cellulose (MHPC), ethylhydroxyethyl cellulose (EHEC), hydrophobically modified ethylhydroxyethyl cellulose (HMEHEC) and, mixtures thereof.

23. The process of claim 1 wherein the polysaccharide hydrolysis enzyme is cellulase and the molecular weight degraded polysaccharide derivative is hydroxyethyl cellulose (HEC).

24. The process of claim 1 wherein the polysaccharide hydrolysis enzyme is cellulase and the molecular weight degraded polysaccharide derivative is hydrophobically modified hydroxyethyl cellulose (HMHEC).

25. The process of claim 24 wherein the hydrophobically modified hydroxyethyl cellulose is hydroxyethyl cellulose substituted with a long chain alkyl radical having 10 to 24 carbon atoms in an amount of about 0.1 to about 3 wt. %.

26. The process of claim 24 wherein the hydrophobically modified hydroxyethyl cellulose is hydroxyethyl cellulose substituted with a long chain alkyl radical attached via a linkage selected from the group consisting of ether linkages, ester linkages, amide linkages and urethane linkages.

27. The process of claim 24 wherein the hydrophobically modified hydroxyethyl cellulose is hydroxyethyl cellulose substituted with a long chain alkyl radical attached via an ether linkage.

28. The process of claim 24 wherein the hydrophobically modified hydroxyethyl cellulose is hydroxyethyl cellulose substituted with an alkylaryl radical having 10 to 24 carbon atoms in an amount of about 0.1 to about 3 wt. %.

29. The process of claim 24 wherein the hydrophobically modified hydroxyethyl cellulose is hydroxyethyl cellulose substituted with an alkyl radical containing 16 carbon atoms in an amount of about 0.1 to about 3 wt. %.

30. The process of claim 24 wherein the hydrophobically modified hydroxyethyl cellulose is hydroxyethyl cellulose substituted with a perfluorinated alkyl hydrophobe group.

31. The process of claim 1 wherein the polysaccharide hydrolysis enzyme is cellulase and the molecular weight degraded polysaccharide derivative is hydrophobically modified ethylhydroxyethyl cellulose (HMEHEC).

32. The process of claim 1 wherein the molecular weight degraded polysaccharide derivative is guar ether and the polysaccharide hydrolysis enzyme is mannase.

33. The process of claim 1 wherein the polysaccharide hydrolysis enzyme is mannase and the molecular weight degraded polysaccharide derivative is guar ether selected from the group consisting of carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar) and mixtures thereof.

34. The process of claim 1 wherein the pigment volume concentration (PVC) of the paint is from about 15% to about 85%; the paint retains at least about 80% of its initial viscosity 24 hours after it is inoculated with polysaccharide hydrolysis enzyme; and the molecular weight degraded polysaccharide derivative resistant to enzyme hydrolysis is selected from the group consisting of cellulose derivatives, guar derivatives, starch derivatives, and pectin derivatives and is characterized by a 1% solution of it in water having a viscosity of about 5 to about 60,000 cps and retaining at least about 55% of its initial viscosity 24 hours after the solution is inoculated with polysaccharide hydrolysis enzyme.

35. The process of claim 1 wherein the pigment volume concentration (PVC) of the paint is from about 15% to about 85%; the paint retains at least about 80% of its initial viscosity 24 hours after it is inoculated with polysaccharide hydrolysis enzyme; the polysaccharide hydrolysis enzyme is cellulase; and the molecular weight degraded polysaccharide derivative resistant to enzyme hydrolysis is cellulose ether characterized by a 1% solution of it in water having a viscosity of about 5 to about 60,000 cps and retaining at least about 55% of its initial viscosity 24 hours after the solution is inoculated with cellulase.

36. The process of claim 1 wherein the pigment volume concentration (PVC) of the paint is from about 15% to about 85%; the paint retains at least about 80% of its initial viscosity 24 hours after it is inoculated with polysaccharide hydrolysis enzyme; the polysaccharide hydrolysis enzyme is mannase; and the molecular weight degraded polysaccharide derivative resistant to enzyme hydrolysis is guar ether characterized by a 1% solution of it in water having a viscosity of about 5 to about 60,000 cps and retaining at least about 55% of its initial viscosity 24 hours after the solution is inoculated with mannase.

37. A process for making a biostable water-borne paint comprising:
(a) treating precursor polysaccharide derivative with polysaccharide hydrolysis enzyme in aqueous medium for a time sufficient to obtain reduced molecular weight polysaccharide derivative; and
b) mixing the reduced molecular weight polysaccharide derivative with an effective amount of at least one other water-borne paint ingredient to obtain a water-borne paint.

38. The process of claim 37 wherein the at least one other water-borne paint ingredient is selected from the group consisting of pigment and latex film forming-polymeric binder.

39. The process of claim 37 wherein the pigment volume concentration (PVC) of the water-borne paint is from about 15% to about 85%.

40. The process of claim 37 wherein the pigment volume concentration (PVC) of the water-borne paint is from about 15% to about 80%.

41. The process of claim 37 wherein a 1% aqueous solution of the reduced molecular weight polysaccharide derivative has a viscosity of about 5 to about 60,000 cps.

42. The process of claim 37 wherein a 1% aqueous solution of the reduced molecular weight polysaccharide derivative has a viscosity of about 50 to about 60,000 cps.

43. The process of claim 37 wherein a 1% aqueous solution of the reduced molecular weight polysaccharide derivative has a viscosity of about 150 to about 60,000 cps.

44. The process of claim 37 wherein a 1% aqueous solution of the reduced molecular weight polysaccharide derivative has a viscosity of about 500 to about 60,000 cps.

45. The process of claim 37 wherein the reduced molecular weight polysaccharide derivative is characterized by a 1% solution of it in water retaining at least about 55% of its initial viscosity 24 hours after the solution is inoculated with polysaccharide hydrolysis enzyme.

46. The process of claim 37 wherein the reduced molecular weight polysaccharide derivative is characterized by a 1% solution of it in water retaining at least about 75% of its initial viscosity 24 hours after the solution is inoculated with polysaccharide hydrolysis enzyme.

47. The process of claim 37 wherein the reduced molecular weight polysaccharide derivative is characterized by a 1% solution of it in water retaining at least about 80% of its initial viscosity 24 hours after the solution is inoculated with polysaccharide hydrolysis enzyme.

48. The process of claim 37 wherein the water-borne paint retains at least about 80% of its initial viscosity 24 hours after it is inoculated with polysaccharide hydrolysis enzyme.

49. The process of claim 37 wherein the water-borne paint retains at least about 90% of its initial viscosity 24 hours after it is inoculated with polysaccharide hydrolysis enzyme.

50. The process of claim 37 wherein the water-borne paint retains at least about 95% of its initial viscosity 24 hours after it is inoculated with polysaccharide hydrolysis enzyme.

51. The process of claim 37 wherein the water-borne paint retains at least about 98% of its initial viscosity 24 hours after it is inoculated with polysaccharide hydrolysis enzyme.

52. The process of claim 37 wherein the precursor polysaccharide derivative is selected from the group consisting of cellulose derivatives, guar derivatives, starch derivatives, pectin derivatives, pullulan derivatives, alginate derivatives, gellan derivatives and mixtures thereof.

53. The process of claim 37 wherein the precursor polysaccharide derivative is selected from the group consisting of ether derivatives, ester derivatives, amide derivatives, urethane derivatives and mixture thereof.

54. The process of claim 37 wherein the precursor polysaccharide derivative is a derivative of cellulose and the polysaccharide hydrolysis enzyme is cellulase.

55. The process claim 37 wherein the precursor polysaccharide derivative is cellulose ether and the polysaccharide hydrolysis enzyme is cellulase.

56. The process of claim 37 wherein the polysaccharide hydrolysis enzyme is cellulase and the precursor polysaccharide derivative is cellulose ether selected from the group consisting of hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC), cationic hydrophobically modified hydroxyethyl cellulose (cationic HMHEC) and mixtures thereof.

57. The process of claim 37 wherein the polysaccharide hydrolysis enzyme is cellulase and the precursor polysaccharide derivative is cellulose ether selected from the group consisting of hydroxyethyl cellulose (HEC), carboxymethyl cellulose (CMC), hydrophobically modified hydroxyethyl cellulose (HMHEC), methylhydroxypropyl cellulose (MHPC), ethylhydroxyethyl cellulose (EHEC), hydrophobically modified ethylhydroxyethyl cellulose (HMEHEC) and mixtures thereof.

58. The process of claim 37 wherein the polysaccharide hydrolysis enzyme is cellulase and the precursor polysaccharide derivative is hydroxyethyl cellulose (HEC).

59. The process of claim 37 wherein the polysaccharide hydrolysis enzyme is cellulase and the precursor polysaccharide derivative is hydrophobically modified hydroxyethyl cellulose (HMHEC).

60. The process of claim 59 wherein the hydrophobically modified hydroxyethyl cellulose is hydroxyethyl cellulose substituted with a long chain alkyl radical having 10 to 24 carbon atoms in an amount of about 0.1 to about 3 wt. %.

61. The process of claim 59 wherein the hydrophobically modified hydroxyethyl cellulose is hydroxyethyl cellulose substituted with a long chain alkyl radical attached via a linkage selected from the group consisting of ether linkages, ester linkages, amide linkages and urethane linkages.

62. The process of claim 59 wherein the hydrophobically modified hydroxyethyl cellulose is hydroxyethyl cellulose substituted with a long chain alkyl radical attached via an ether linkage.

63. The process of claim 59 wherein the hydrophobically modified hydroxyethyl cellulose is hydroxyethyl cellulose substituted with an alkylaryl radical having 10 to 24 carbon atoms in an amount of about 0.1 to about 3 wt. %.

64. The process of claim 59 wherein the hydrophobically modified hydroxyethyl cellulose is hydroxyethyl cellulose substituted with an alkyl radical containing 16 carbon atoms in an amount of about 0.1 to about 3 wt. %.

65. The process of claim 59 wherein the hydrophobically modified hydroxyethyl cellulose is hydroxyethyl cellulose substituted with a perfluorinated alkyl hydrophobe group.

66. The process of claim 37 wherein the polysaccharide hydrolysis enzyme is cellulase and the precursor polysaccharide derivative is hydrophobically modified ethylhyroxyethyl cellulose (HMEHEC).

67. The process of claim 37 wherein the precursor polysaccharide derivative is guar ether and the polysaccharide hydrolysis enzyme is mannase.

68. The process claim 37 wherein the polysaccharide hydrolysis enzyme is mannase and the precursor polysaccharide derivative is guar ether selected from the group consisting of carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar) and mixtures thereof.

69. The process of claim 37 wherein the pigment volume concentration (PVC) of the paint is from about 15% to about 85%; the paint retains at least about 80% of its initial viscosity 24 hours after it is inoculated with polysaccharide hydrolysis enzyme; and the reduced molecular weight polysaccharide derivative is selected from the group consisting of cellulose derivatives, guar derivatives, starch derivatives, and pectin derivatives, and is characterized by a 1% solution of it in water having a viscosity of about 5 to about 60,000 cps and retaining at least about 55% of its initial viscosity 24 hours after the solution is inoculated with polysaccharide hydrolysis enzyme.

70. The process of claim 37 wherein the pigment volume concentration (PVC) of the paint is from about 15% to about 85%; the paint retains at least about 80% of its initial viscosity 24 hours after it is inoculated with polysaccharide hydrolysis enzyme; the polysaccharide hydrolysis enzyme is cellulase; and the reduced molecular weight polysaccharide derivative is cellulose ether characterized by a 1% solution of it in water having a viscosity of about 5 to about 60,000 cps and at least about 55% of its initial viscosity 24 hours after the solution is inoculated with cellulase.

71. The process of claim 37 wherein the pigment volume concentration (PVC) of the paint is from about 15% to about 85%; the paint retains at least about 80% of its initial viscosity 24 hours after it is inoculated with polysaccharide hydrolysis enzyme; the polysaccharide hydrolysis enzyme is mannase; and the reduced molecular weight polysaccharide derivative is guar ether characterized by a 1% solution of it in water having a viscosity of about 5 to about 60,000 cps and retaining at least about 55% of its initial viscosity 24 hours after the solution is inoculated with mannase.

* * * * *